March 14, 1961 F. LANDBRECHT 2,974,754
DASHPOT FOR CAMERA SHUTTER
Filed April 18, 1957 2 Sheets-Sheet 1

INVENTOR.
Franz LANDBRECHT
BY Michael S. Striker

March 14, 1961    F. LANDBRECHT    2,974,754
DASHPOT FOR CAMERA SHUTTER

Filed April 18, 1957    2 Sheets-Sheet 2

INVENTOR.
Franz LANDBRECHT
BY Michael S. Striker
agt.

2,974,754
Patented Mar. 14, 1961

2,974,754

DASHPOT FOR CAMERA SHUTTER

Franz Landbrecht, Munich, Germany, assignor to Agfa Aktiengesellschaft, Munich, Germany Filed Apr. 18, 1957, Ser. No. 653,619

Claims priority, application Germany Apr. 27, 1956

6 Claims. (Cl. 188—95)

The present invention relates to control assemblies which are capable of automatically controlling the speed of movement of a given device in accordance with the condition of a variable influence.

For example, the control structure of the present invention may be used in a camera for automatically controlling the speed of movement of a shutter thereof so as to regulate in this way the exposure made by the camera in a fully automatic manner and in accordance with the lighting conditions.

In cameras where the exposure is automatically controlled, a photoelectric cell will respond to the lighting conditions so as to actuate a galvanometer which in turn actuates certain elements to provide the automatic control. Because the moving coil of the galvanometer must be easily and freely turnable and has special bearings provided for this purpose certain problems are involved in providing the desired control, because an element turned, for example, by the moving coil of the galvanometer should not rub against any other element so as to produce any frictional resistance to the turning of the moving coil of the galvanometer, and on the other hand where a fluid pressure type of control is involved the elements moved by the galvanometer must be located very close to fluid passages in order to close the latter, and this latter requirement makes it very difficult to provide the necessary free movement of the galvanometer coil.

One of the objects of the present invention is to overcome the above drawbacks by providing a control assembly of the above type wherein an element moved by a galvanometer is freely movable and does not frictionally engage any other elements, and at the same time the element moved by the galvanometer is capable of blocking a fluid passage to a predetermined extent, for example, without in any way stressing the bearings of the moving coil of the galvanometer.

Another object of the present invention is to provide a control assembly of the above type in which the control is set into operation in the case of a camera by actuation of a shutter release member.

A further object of the present invention is to provide structure capable of accomplishing the above objects and at the same time composed of simple and ruggedly constructed elements which are very reliable in operation.

With the above objects in view, the present invention mainly consists of a control assembly which includes a fluid pressure means for regulating the speed of movement of a device to be controlled, this fluid pressure means including a passage member formed with a passage means through which the fluid of the fluid pressure means flows. A manually operable release means is provided for releasing the device for movement, and a closure member is normally spaced from but located adjacent to the passage member. A moving means is responsive to a variable influence and is operatively connected to the closure member for automatically moving the same to an overlapping relationship with respect to the passage means of the passage member corresponding to the condition of the variable influence. An actuating means is provided for moving one of the above-mentioned passage and closure members with respect to the other to a position where the passage means is closed to an extent determined by the variable influence. This actuating means may be connected to the above-mentioned release means for releasing the device for movement, and in this case the release means operates the actuating means to cause the passage means to be closed to the desired extent before the device is actually released for movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
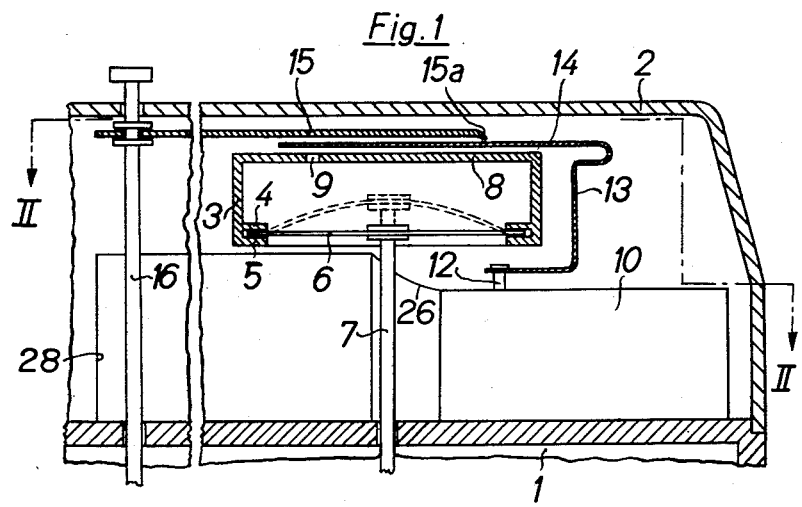
Fig. 1 is a fragmentary partly sectional elevational view of the structure of the invention as used in a camera.
Figure 2:
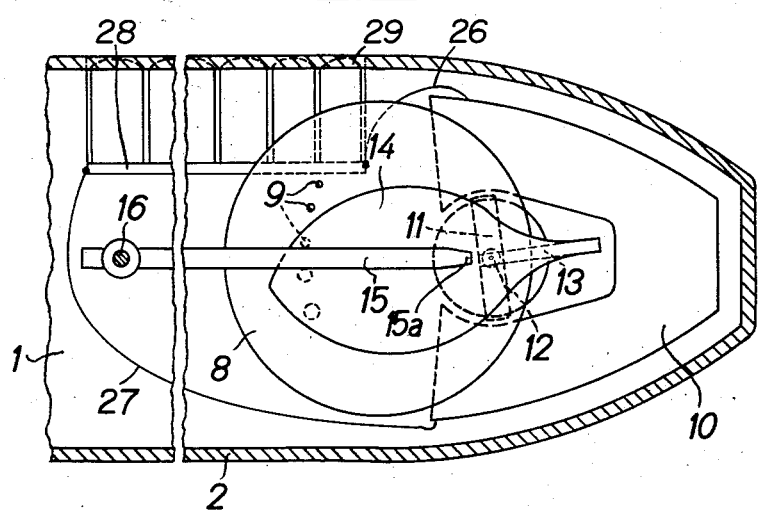
Fig. 2 is a partly sectional plan view taken along line II—II of Fig. 1 in the direction of the arrows.

Referring to Figs. 1 and 2, a camera housing part 1 is adapted to enclose film spools and the like, and this camera housing part 1 carries a removable cover member 2 which in a known way encloses above the top wall of the camera housing part 1 a number of different camera elements among which is an unillustrated viewfinder. Within the housing cover 2 there is located a cylindrical enclosure 3 which forms part of a fluid pressure means for regulating the speed of movement of an unillustrated shutter of the camera. In the illustrated example the fluid pressure means is pneumatic, and the cylindrical enclosure 3 thereof is provided at its bottom end with a pair of inwardly extending annular rings 4 and 5 which clamp between themselves a thin elastic membrane 6 made, for example, of rubber. The membrane 6 is fixed to one end of a push rod 7 whose opposite end which is not shown in Fig. 1 is connected to an element which participates in the movement of the shutter. Thus, the speed of movement of the shutter will be dependent upon the speed of movement of the latter element which is connected to the push rod 7, and the fluid pressure means retards the movement of the released shutter in a manner described below by retarding the movement of the element which is connected to the push rod 7. The fluid pressure means includes a passage member formed by the valve plate 8 which is provided with a passage means in the form of the several openings 9 which are respectively of different sizes and which are arranged in the manner shown clearly in Fig. 2.

Within the enclosure formed by the cover 2 together with the top wall of the housing part 1, is located a moving means which is responsive to a variable influence. In the example shown the moving means is in the form of a galvanometer which is operatively connected to a photo-electric cell responsive to the lighting conditions, so that the variable influence is the lighting conditions. The galvanometer includes the horseshoe magnet 10 and the turnable coil 11. The unillustrated windings of the coil are connected electrically by two wires 26 and 27 with a photoelectric cell 28 of the exposure control device which is arranged behind the window 29 in the front wall of removable cover member 2. The coil includes a central shaft 12 extending axially of the coil and supported for turning movement by suitable bearings which render it very easy for the coil 11 to turn. In the embodiment of the invention which is shown in Figs. 1 and 2 the shaft 12 carries at its upper end a suitably bent leaf spring 13 which is fixed to the shaft 12 so as to turn with the latter, and this leaf spring carries a closure member 14 in the form of a thin leaf-like plate which forms an extension of the leaf spring 13. Thus, the plate 14 will turn together with the shaft 12, and as may be seen from Fig. 2 the plate 14 will cover one or more of the openings 9 in accordance with the lighting conditions, so that in this way the plate 14 is moved by the moving means 10—12 in its own plane so as to be maintained parallel to but spaced slightly from the valve plate 8. Because of the spacing between the plate 8 and the plate 14 there is no frictional resistance to the movement of the coil 11, and the latter together with elements 12—14 can freely turn so as to locate the plate 14 in an angular position corresponding faithfully to the lighting condition. Thus, the passage means 9 will be overlapped by the plate 14 to an extent determined by the lighting conditions.

An actuating means is provided for moving the plate 14 toward and into engagement with the plate 8 when it is desired to close the passage means 9 to the extent determined by the lighting conditions, and this actuating means includes an elongated springy member 15 which is stiffer than the plate 14 and which has a free end 15a bent downwardly for engaging the plate 14 at a point adjacent to the turning axis thereof, this turning axis being normal to the plate 14, as is evident from Figs. 1 and 2. The actuating means formed by the motion transmitting member 15 is fixed to the shutter release member 16 which extends to the exterior of the cover 2 so as to be accessible to the operator. Thus, when the operator pushes the member 16 downwardly, as viewed in Fig. 1, the motion transmitting member 15 will move downwardly with the same.

When it is desired to take a picture with a camera including the above structure, the shutter is cocked, and as a result the membrane 6 is moved from the solid to the dotted line position shown in Fig. 1, the push rod 7 moving upwardly, as viewed in Fig. 1 at this time. When the operator pushes downwardly upon the release member 16 the motion transmitting member 15 also moves downwardly and its free end portion 15a engages the closure member 14 to move the latter into engagement with the plate 8 so as to close the passage means 9 to an extent determined by the lighting conditions. Shortly after the plate 14 engages the plate 8 the continued movement of the member 16 causes the shutter to be released. At this time the spring of the shutter causes the latter to operate so as to make an exposure, and this spring acts through the elements connected to the push rod 7 to urge the latter downwardly from the dotted line position shown in Fig. 1. However, this downward movement of the push rod 7 is resisted by the fact that the membrane 6 is capable of sucking air into the enclosure 3 only to an extent permitted by the portion of the passage means 9 which is not covered by the closure member 14. Thus, in accordance with the particular angular position of the closure member 14 the fluid pressure means will retard the movement of the shutter to a greater or less extent so as to control in a fully automatic manner the exposure time.

As was mentioned above, the end portion 15a of the motion transmitting member 15 preferably engages the plate 14 adjacent to the turning axis of the latter. The plate 14 remains in substantially parallel relationship with the plate 8 during movement toward and engagement with the latter, and the light leaf spring 13 yields so that the bearings of the coil 11 are not materially stressed. The return of the actuating means or motion transmitting member 15 to its rest position shown in Fig. 1 where the end 15a of the member 15 is out of engagement with the plate 14 is effected by the return of the shutter release member 16 from its operating to its rest position, and the resilience of the spring means 13 returns the plate 14 to the position where it is spaced slightly from and parallel to the plate 8 so that the plate 14 can freely turn together with the moving coil of the galvanometer.

In the above-described arrangement the pressure within the enclosure 3 is less than atmospheric pressure during movement of the membrane 6 from the dotted to the solid line position shown in Fig. 1. It is also possible to provide an arrangement where the pressure in the enclosure 3 is greater than atmospheric pressure in order to retard the movement of the shutter, and in this case it is preferred to locate the free end 15a of the member 15 close to the passage means 9 in order to place the plate 14 in a position closing the passage means while the pressure in the container 3 is greater than atmospheric pressure.

Figure 3:
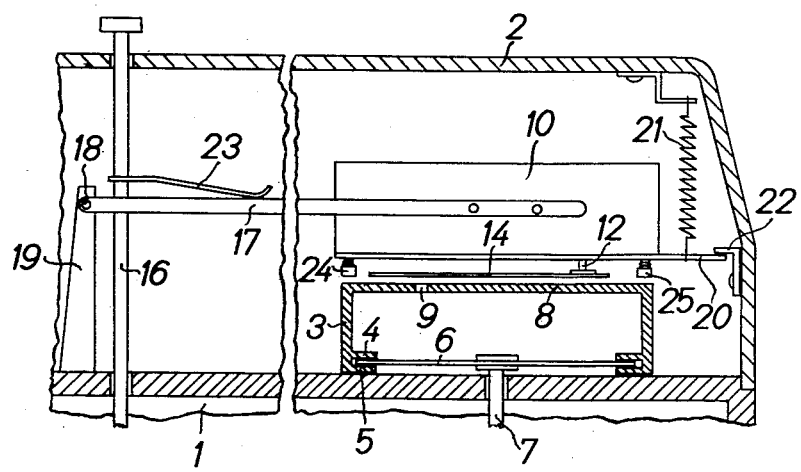
Fig. 3 is a fragmentary partly sectional elevational view illustrating another embodiment of the structure of the invention.

It is also possible to provide an arrangement where the closure member 14 can move toward the valve plate 8 together with the galvanometer means 10, 11, and such construction is shown in Fig. 3 where those elements which are identical with those described above are indicated with the same reference characters.

Referring to Fig. 3, the entire galvanometer 10, 11 together with the closure member 14 is arranged over the valve plate 8 of the enclosure 3, and this entire assembly is carried by one or two turnable arms 17, an arm 17 being shown in Fig. 3 connected to the horseshoe magnet 10. The left end of the arm 17 is supported by a pivot pin 18 carried by a supporting block 19 mounted on the top wall of the camera housing 1 within the cover member 2, and thus the arm 17 is turnable about the axis of the pivot pin 18. The shaft 12 of the galvanometer directly carries the closure plate 14, so that in this way the entire galvanometer together with the plate 14 is movable as a unit.

A plate 20 is fixed to the underside of the magnet 10 of the galvanometer, and a spring 21 is connected at one end to the plate 20 and at its opposite end to the cover member 2 so as to urge the plate 20 upwardly, as viewed in Fig. 3, the spring 21 thus urging the lever 17 in a counterclockwise direction, as viewed in Fig. 3. The upward movement of the right end of the plate 20 is limited by a stop member 22 carried by the member 2, and in this way the closure plate 14 is maintained at the desired distance from the valve plate 8 in parallel relation thereto. Thus, with this arrangement also there is no resistance to the turning of the coil of the galvanometer due to any elements which frictionally engage the plate 14 which turns with the coil.

In the embodiment of the invention which is shown in Fig. 3 the actuating means which is operatively connected to the plate 14 so as to move the latter into engagement with the plate 8 includes not only the lever 17 but is also formed in part by the moving means formed by the galvanometer structure 10—12, since in this embodiment the plate 14 is connected to the lever 17 through the moving means. This actuating means for operating the plate 14 further includes a springy motion transmitting member 23 which is fixed to the shutter releasing member 16 and which has its right end in engagement with the lever 17, this motion transmitting member 23 being stiff enough to turn the lever 17 in a clockwise direction, as viewed in Fig. 3, against the tension of the spring 21.

A pair of adjusting screws 24 and 25 are threadedly carried by the plate 20 and extend downwardly therefrom toward the plate 8. These screws 24 and 25 are carefully adjusted so that they engage the plate 8 when the closure plate 14 closes the passage means 9 to a predetermined extent by engaging the plate 8. The arrangement is such that the passage means 9 is closed to the desired extent by the closure plate 14 with the screws 24 and 25 engaging the plate 8 but without stressing the bearing of the movable coil of the galvanometer. If desired a springy element similar to the element 13 of Fig.

1 may be interposed between the shaft 12 and plate 14. Thus, with the embodiment of Fig. 3 when the shutter release member 16 is depressed by the operator the plate 14 will first engage the plate 8 to close the passage means 9 to the extent determined by the position of the coil of the galvanometer, and then during the continued movement of the member 16 the shutter which has previously been cocked will be released, and the operation of the shutter will be retarded by the fluid pressure means of Fig. 3 in the same way as described above in connection with Figs. 1 and 2.

Of course, instead of mounting the galvanometer on one or two turnable arms 17, it is possible to provide a parallelogram linkage which carries the galvanometer so as to move the same together with the plate 14 toward and away from the plate 8 while maintaining the plate 14 parallel to the latter. Also, instead of moving the closure plate 14 toward the valve plate 8, it is also possible to provide an arrangement where the enclosure 3 together with the valve plate 8 thereof move toward the plate 14.

Although the structure has been described above in connection with a camera, it is apparent that the assembly of the invention may be advantageously used in any other device where the measurement of a variable influence is transferred to an adjustable device.

With the structure of Fig. 3 the arm 17 is sufficiently long and the distance through which the plate 14 need be moved toward the plate 8 is so small that this plate 14 remains for all practical purposes parallel to the plate 8 during movement of the plate 14 toward and away from the latter while the arm 17 turns through a very slight angle about the axis of the pivot pin 18.

It will be understood that each of the elements described above, or two or more together, may also find a useful application in other types of control assembly differing from the types described above.

While the invention has been illustrated and described as embodied in camera control assembly, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photoelectric exposure control assembly for a camera, in combination, fluid pressure means for regulating the speed of movement of a device to be controlled, said fluid pressure means including a valve plate formed with a passage means through which fluid of the fluid pressure means flows; a closure plate parallel to and spaced slightly from said valve plate; galvanometer means operatively connected to said closure plate for moving the same to an overlapping relationship with respect to said passage means; and mechanical means engaging one of said plates for positively moving said one plate toward and into engagement with the other of said plates for locating said plates with respect to each other in a position where said passage means is closed by said closure plate to an extent determined by the overlapping relationship to which said closure plate is moved by said galvanometer means with respect to said passage means.

2. In a photoelectric exposure control assembly of a camera, in combination, fluid pressure means operatively connected to a device for controlling the speed of movement thereof, said fluid pressure means including a valve plate formed with a passage means through which fluid of the fluid pressure means flows; a closure plate parallel to and spaced slightly from said valve plate; galvanometer means operatively connected to said closure plate for moving the same to an overlapping relationship with respect to said passage means while maintaining said closure plate parallel to said valve plate, said galvanometer means together with said closure plate being movably arranged with respect to said valve plate; and mechanical means engaging said galvanometer means for positively moving the same together with said closure plate to a position where said closure plate engages said valve plate to close said passage means to an extent determined by the overlapping relationship to which said closure plate is moved by said galvanometer means with respect to said passage means.

3. In a photoelectric exposure control assembly of a camera, in combination, fluid pressure means for regulating the speed of movement of a device to be controlled, said fluid pressure means including a valve plate formed with a passage means through which fluid of the fluid pressure means flows; a closure plate parallel to and spaced slightly from said valve plate; resilient means supporting said closure plate in a position parallel to and spaced slightly from said valve plate and yieldably resisting movement of said closure plate toward said valve plate; galvanometer means connected to said resilient means for acting through the latter on said closure plate for turning the latter to an overlapping relationship with respect to said passage means; and mechanical means for engaging said closure plate and positively moving the same against the force of said resilient means into engagement with said valve plate for closing said passage means to an extent determined by the overlapping relationship to which said closure plate is moved by said galvanometer means with respect to said passage means.

4. In a control assembly for regulating the speed of movement of a device, in combination, fluid pressure means for regulating the speed of movement of a device to be controlled, said fluid pressure means including a passage member formed with a passage means through which the fluid of said fluid pressure means flows, the rate of fluid flow through said passage means determining the speed of movement of the device; a closure member mounted adjacent to said passage means for movement between a plurality of different initial flow adjusting positions, one of said members being movable relative to the other of said members so as to bring said closure member from each of said initial flow adjusting positions into a final flow adjusting position superimposed upon said passage means and engaging said passage member for limiting the flow of fluid through said passage means to a different extent; mechanical actuating means engaging at least one of said members for positively moving said one member into engagement with the other member so as to bring said closure member from any one of said initial flow adjusting positions into the corresponding final flow adjusting position; and operating means for causing flow of pressure fluid through said passage means after said closure member is brought into one of its final flow adjusting positions.

5. In a control assembly for regulating the speed of movement of a device, in combination, fluid pressure means for regulating the speed of movement of a device to be controlled, said fluid pressure means including a passage member formed with a passage means through which the fluid of said fluid pressure means flows, the rate of fluid flow through said passage means determining the speed of movement of the device; a closure member mounted normally spaced from but located adjacent to said passage means for movement between a plurality of different initial flow adjusting positions, one of said members being movable relative to the other of said members so as to bring said closure member from each of said initial flow adjusting positions into a final flow adjusting position superimposed upon said passage means and engaging said passage member for limiting the flow of fluid through said passage means to a different extent; mechanical actuating means engaging at least one of said members for positively moving said one member into engagement with the other member so as to bring said closure member from any one of said initial flow adjusting positions into the corresponding final flow adjusting position; operating means for causing flow of pressure fluid through said passage means after said member is brought into one of its final flow adjusting positions; and means operatively connected to said one member for returning the latter to a position where said closure member is again normally spaced from but located adjacent to said passage means.

6. In a control assembly for regulating the speed of movement of a device, in combination, fluid pressure means for regulating the speed of movement of a device to be controlled, said fluid pressure means including a passage plate formed with a passage means through which the fluid of said fluid pressure means flows, the rate of fluid flow through that passage means determining the speed of movement of the device; a closure plate extending parallel to and normally spaced from but located adjacent said passage plate and being mounted for turning movement about a fixed axis between a plurality of different initial flow adjusting positions and movable from each said initial flow adjusting position into a final flow adjusting position superimposed upon said passage means and engaging said passage plate for limiting the flow of fluid through that passage means to a different extent; mechanical actuating means having a free end engaging said closure plate adjacent to the turning axis thereof for positively moving said closure plate into engagement with said passage plate to bring said closure plate from any one of said initial flow adjusting positions into the corresponding final flow adjusting position; and operating means for causing flow of pressure fluid through said passage means after said closure plate is brought into one of its final flow adjusting positions.

References Cited in the file of this patent
UNITED STATES PATENTS

| | | |
|---|---|---|
| 2,148,963 | Rauch | Feb. 28, 1939 |
| 2,187,953 | Schmidt | Jan. 23, 1940 |
| 2,800,844 | Durst et al. | July 30, 1957 |